United States Patent Office 2,760,610
Patented Aug. 28, 1956

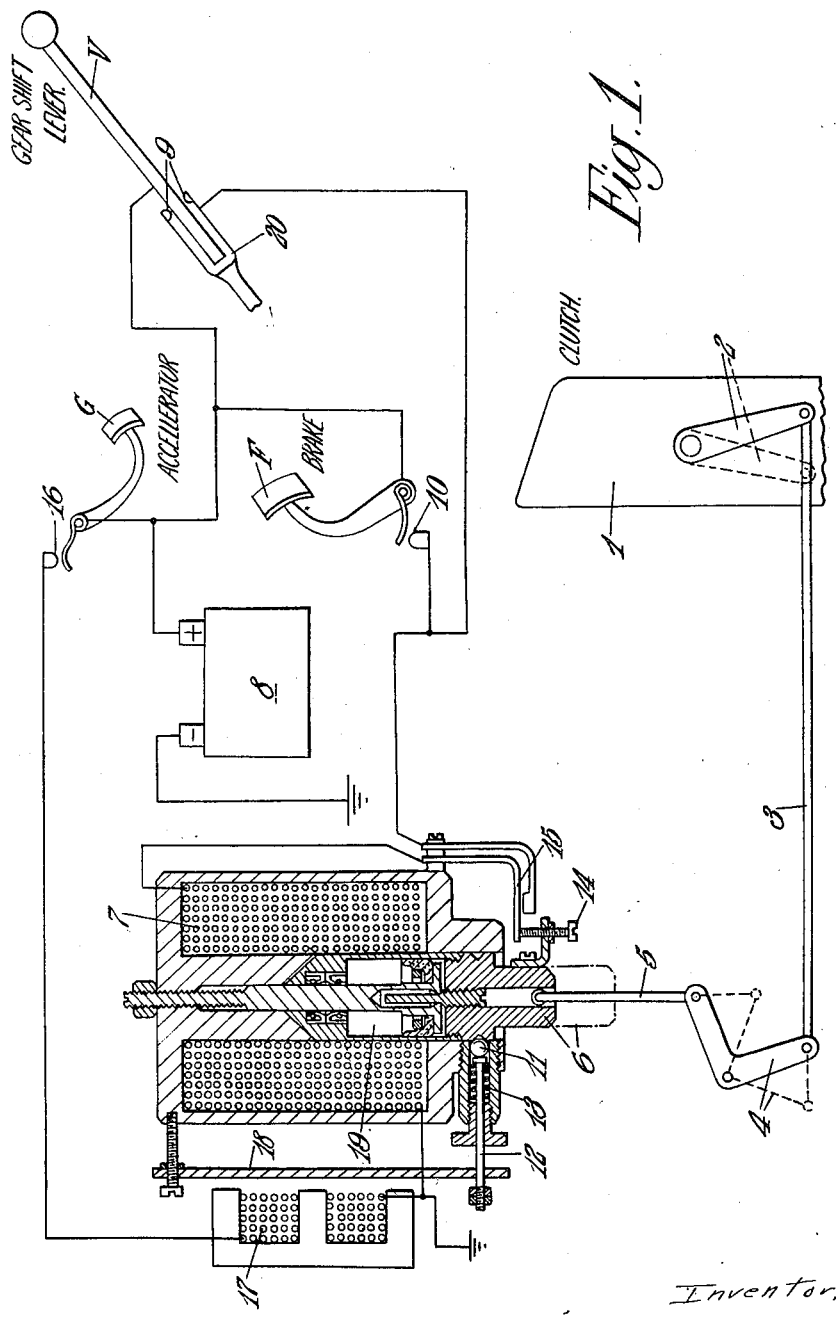

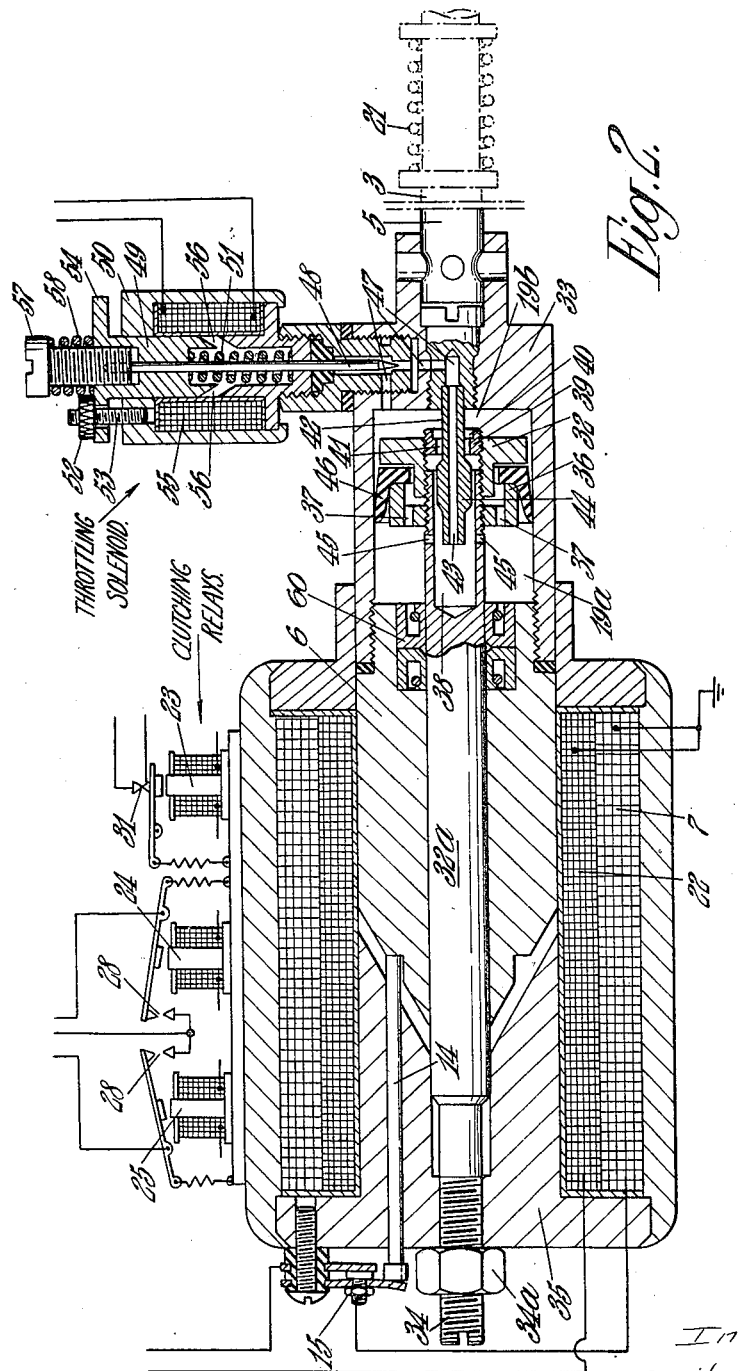

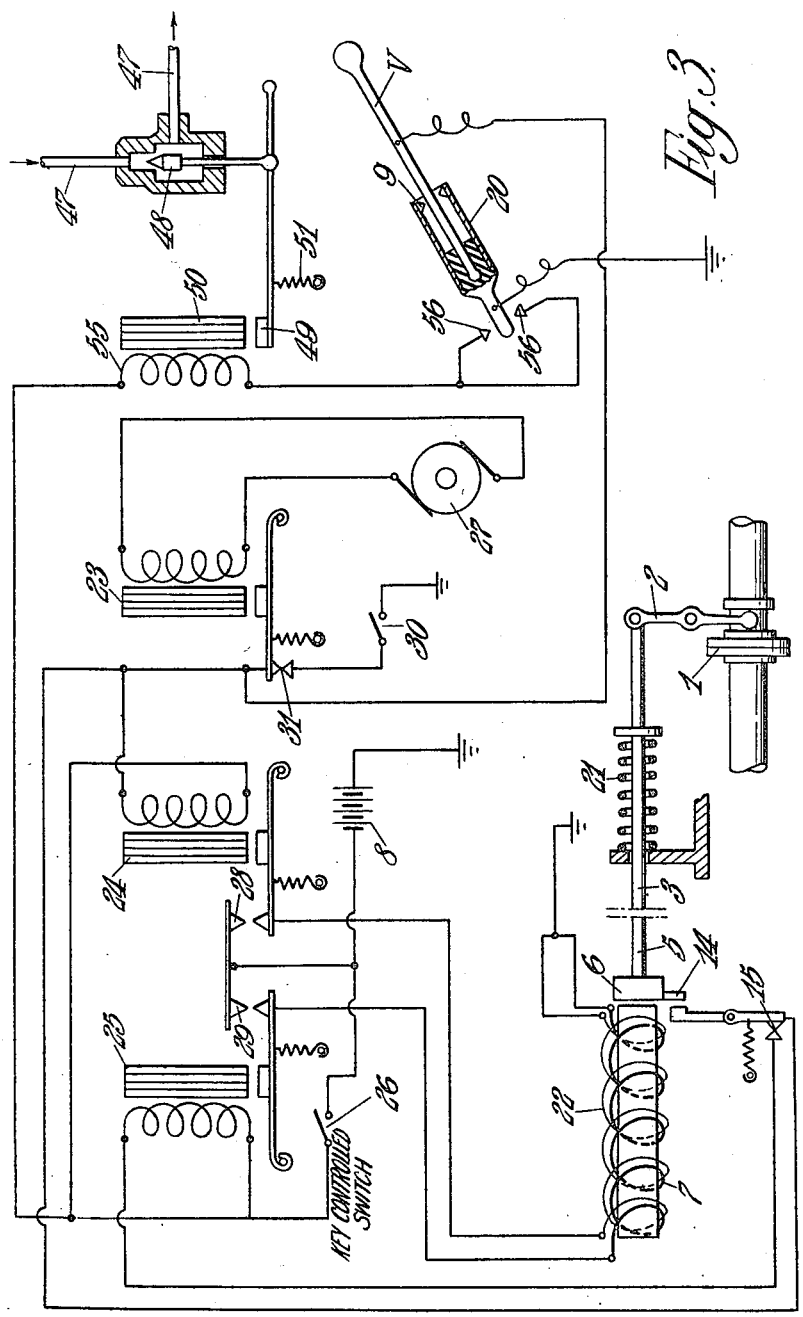

2,760,610

CONTROL MEANS FOR CLUTCHES IN MOTOR VEHICLES

Cyril Prachar, Paris, France, assignor to Société Sitraco, a body corporate of Belgium Application January 3, 1951, Serial No. 204,200

Claims priority, application France January 6, 1950

11 Claims. (Cl. 192—.052)

This invention relates to clutches employed in the transmissions of motor vehicles and has for its object to provide means whereby the control or actuation of such clutches may be effected automatically in accordance with other operations or control manipulations carried out by the driver of the vehicle. A further object is to provide improved means for effecting automatic control or actuation of the vehicle clutch without requiring the attention of the driver.

The invention consists in a clutch control system for motor vehicles comprising automatic declutching means for disengaging the clutch against the action of the means normally urging said clutch into clutching position, automatic locking means for retaining or holding the clutch in disengaged position, automatic releasing means to make said locking means inoperative and means to bring said automatic declutching means or said automatic releasing means into action according as the running conditions of the vehicle require clutching or declutching.

By the above arrangement there is provided an automatic control or actuation of the vehicle clutch which does not require the attention of the driver.

The means according to the invention for disengaging the clutch may be actuated by electrical, mechanical, or fluid pressure means. Thus electrical, mechanical, hydraulic, pneumatic or any other appropriate power or transmission means can be employed for actuating the clutch disengaging means from the gear changing or brake applying control elements and for actuating the retaining or locking means from the accelerator or throttle control element.

Two embodiments of the invention will be described by way of example, but not in a limiting sense, as applied to an electrical form of control.

In one of said embodiments, the automatic declutching means are brought into action whenever the driver acts upon the gear shift or brake controls, while the automatic releasing means are brought into action whenever the driver acts upon the throttle control.

In this embodiment, since declutching depends upon the brake control, the engine runs freely as soon as said control is actuated so that it is impossible to provide a braking action through the engine.

In the second of said embodiments, said declutching means are brought into action under a well-defined running speed of the engine, as soon as the control system is switched on and, above said speed, whenever the driver acts upon the gear control, while said releasing means are brought into action automatically from said running speed upwards.

Another object of the invention is to provide a clutch control system of the type described, in which, to make the clutching gradual, there is interposed between the automatic control means and the clutch a hydraulic checking device, for instance of the kind described in the French Patent No. 943,213 of September 11, 1946, or in the British Patent No. 619,150. Said checking device comprised only manual adjusting means to vary the gradual action of the clutch, said adjusting means being out of reach of the driver, so that, once said gradual action has been adjusted at the desired value, it cannot be varied when driving and so that the clutching takes place with the same gradual action whatever the position of the gear-shift control.

Now, it will be clear that it is extremely advantageous to have two different degrees of gradual action available, according as the clutch is to be engaged at a low gear or at higher gears.

When shifting into a low gear, the gradual clutch action should be sufficient to permit setting the vehicle into motion with a low running speed of the engine, while, when shifting from a low gear to a higher gear or vice versa, a lower degree of gradual action is sufficient, since the engine is to be clutched with parts rotating at a speed near to its own. Furthermore, it is also advantageous to provide separate means for adjusting each degree of gradual action, as required.

Another object of the invention is therefore to provide a control system of the type described, further comprising automatic selecting means controlled from the gear lever to select one of two degrees of gradual clutch action, viz: a high gradual action for low gears and a lower gradual action for higher gears.

A further object of the invention is to provide a clutch control system of the type described, further comprising means to adjust separately each of said degrees of gradual clutch action.

In the second embodiment described above, the braking action through the engine is applied automatically from a predetermined running speed of the engine upwards, and it is sometimes desired to get rid of said action.

Still another object of the invention is to provide a clutch control system of the type described in which said automatic releasing means may be made inoperative at will from a switch within the reach of the driver, so as to permit "free-wheel" running.

On the other hand, in said second embodiment, the clutch is automatically released when the engine rotates slower than said predetermined running speed.

Still another object of the invention is to provide a clutch control system of the type described, further comprising means for clutching, even in the case mentioned in the preceding paragraph and, in particular, when the engine is not in motion. Thus, in particular, it becomes possible to start the engine by displacing the vehicle under any extraneous action (slope, towing, etc.)

Another advantage of the invention is that the main parts of the control system may be arranged in a separate compact unit to be very easily mounted on the vehicle.

Other objects and advantages of the invention will be best understood with reference to the accompanying sheets of drawings in which:

Fig. 1 is a diagrammatical view of a clutch control system according to the invention, in which the automatic control takes place from the gear-shift, throttle and brake controls.

Fig. 2 is a longitudinal cross section of a complete automatic clutching unit the control of which takes place essentially from the engine and gear-shift control, only a part of the circuit diagram being shown.

Fig. 3 is a complete circuit diagram of the unit shown in Fig. 2.

Referring first to Fig. 1, 1 denotes the vehicle clutch, of which 2 is the clutch actuating lever. This lever is represented in full lines in the disengaged position and in dotted lines in the engaged position, towards which the spring (not shown) of the clutch 1 tends to move it, This lever 2 is connected by transmission linkage 3, 4, 5 to the movable part or armature 6 of a solenoid, of which 7 is the winding. This winding 7 receives current from a source 8 whenever contacts 9 are closed when the driver touches the gear lever V, or when the contacts 10 are closed owing to the driver depressing the brake pedal F. In either of such circumstances the solenoid 7 will attract the movable part or armature 6, and brings it, together with the transmission linkage 5, 4, 3 and the lever 2, to the declutched position represented in full lines. The parts are held in this declutched position by a retaining or locking ball 11, which is pushed by a rod 12, urged by a spring 13, and engages in a groove provided for this purpose in the movable part 6. At the same time an abutment member 14 provided upon the movable part 6 opens a contact 15 connected in the circuit of the solenoid 7 so as to interrupt this circuit and obviate any unnecessary consumption of current. Owing to the fact that the ball 11 locks the movable part, the clutch 1 remains disengaged as long as the ball 11 is not released or rendered inoperative.

When the driver depresses the accelerator pedal G or other throttle control element, the latter closes the contact 16, and, through the latter, the circuit of a second elecromagnet 17, which attracts a small plate or bar 18 attached to the rod 12, so that the latter is retracted, and the ball 11 is disengaged from the groove in the movable part 6, so as to liberate the latter. Consequently the clutch 1 can then return into its engaged position under the action of its own spring.

In order that this clutch engaging movement may take place in the gradual manner that is required, the return movement of the movable part 6 from the release position (in full lines) to the closed position (in broken lines) is braked by a control device 19, which however does not exert any braking action upon movement in the opposite direction when the clutch is being disengaged by the solenoid 7. The control device 19 may be of the hydraulic type, for instance of the kind described in French Patent No. 943,213 of September 11, 1946, or British Patent No. 619,150. Instead of being combined with the solenoid 7 the control device 19 may equally well be mounted at any other place on the mechanism, provided it exerts its retarding action upon the clutch-engaging movement.

The contact 9, actuated by the gear lever V, may for instance be designed, as illustrated, by mounting this lever resiliently in a sleeve 20, from which it is insulated, and which it normally does not touch, a contact 9 between the lever V and this sleeve 20 being however established as soon as the driver actuates or manipulates the lever V in any direction whatever. As for the contacts 10 and 16, they are normally open, and are connected to the pedals F and G in such a manner that either of these contacts will be closed as soon as the driver begins to depress the corresponding pedal. The contact 16 may advantageously be so designed as to be closed only at the beginning of the depression of the accelerator pedal G and to re-open when this pedal is depressed further, so as to obviate needless consumption of current by the electromagnet 17.

The operation of the device according to the invention will be readily understood from the foregoing. Every time the driver actuates the lever V to change gear, the contact 9 is closed and disengages the clutch by supplying current to the solenoid 7. Disengagement is maintained on account of the ball 11, and the driver can change gear, after which the closing of the clutch takes place as soon as he depresses the accelerator pedal G, as has been explained above. If the driver does not completely release the accelerator pedal G while he is changing gear, the inactivity of the locking ball 11 resulting therefrom is not of any importance, as clutch disengagement is ensured throughout the time occupied by changing gear, owing to the closure of the contact 9.

In order to stop the vehicle, all the driver has to do is to release the accelerator pedal G and depress the brake pedal F, thereby disengaging the clutch by closing the contact 10, and the entire apparatus remains locked in clutch disengaged position by the ball 11.

In the example shown in Figs. 2 and 3, the solenoid which ensures declutching against the action of spring 21 is completed by a second winding 22 capable of holding, when energized, the movable armature or plunging core 6 in the declutching position. The control of this device takes place through three relays, viz. a clutching (or engine-braking) relay 23, a declutching relay 25 and a locking relay 24. Relays 24 and 25 are operated in parallel from source 8 through a general off-key or ignition circuit control 26. Windings 7 and 22 are also operated in parallel from said source 8. Relay 23 is fed from a dynamo 27 driven from the vehicle engine. The energizing circuit of winding 22 is as follows: ground, winding 22, make contacts 28 of relay 24, battery.

The energizing circuit of winding 7 in parallel with winding 22 is as follows: ground, winding 7, make contacts 29 of relay 25, battery.

Relay 24 is operated through one or both following parallel circuits:

(1) Ground, break, contacts 30, break contacts 31 of relay 23, operating winding of relay 24, key 26, battery.

(2) Ground, make contacts 9 of gear lever V, operating winding of relay 24, key 26, battery.

Break contacts 30 are controlled by a switch which is provided to permit clutching when the rotating speed of dynamo 27 is not sufficient to energize relay 23 and, in particular, when the engine is not started.

Relay 25 is operated, in parallel with relay 24, through one or both following parallel circuits:

(1) Ground, break contacts 30, break contacts 31, break contacts 15, operating winding of relay 25, key 26, battery.

(2) Ground, make contacts 9 of gear lever V, break contacts 15, operating winding of relay 25, key 26, battery.

Finally, a third operating circuit for relays 24 and 25, in parallel with both first mentioned operating circuits, may be provided to permit free-wheel running, by declutching by means of a special switch. In the example shown, such a special switch is not provided and said declutching takes place, as usual, by means of gear lever V.

In Fig. 3, all parts of the system are shown at rest; clutch 1 is engaged.

The operation of the clutch control system shown in Figs. 2 and 3 is as follows: as soon as the driver closes off-key 26, relays 24 and 25 are immediately operated, which closes make contacts 28 and 29 thus completing the energizing circuits of windings 7 and 22. The declutching solenoid then sucks plunging core 6 which, through linkage 5, 3, 2 and against the action of spring 21, disengages clutch 1. As soon as plunging core 6 reaches the declutching position, contacts 15 are opened under the action of abutment 14; the operating circuit of relay 25 is cut-off; relay 25 releases and contacts 29 are opened, so that the operating circuit of winding 7 is cut-off. This arrangement permits, as previously, avoiding any wasteful consumption of power in main winding 7, when the device is declutched. Locking winding 22, however, remains energized and holds plunging core 6 in declutching position.

The driver then shifts into the desired starting gear. The closing of contacts 9 has momentarily no effect since the operation of relay 24 is otherwise ensured through the circuit according to (1) above and since the operating circuit of relay 25 is anyway cut-off at contacts 15. The driver then starts the engine which rotates dynamo 27. If the driver throttles up, when the running speed of the engine reaches a predetermined minimum value, dynamo 27 generates a current sufficient to operate relay 23, which opens contacts 31. The operating circuit of relay 24 is thus cut-off. Said relay releases and opens contacts 28 so that the operating circuit of locking winding 22 is cut-off. The clutching then takes place automatically and gradually under the action of spring 21 and under the checking of hydraulic device 19 (Fig. 9).

When the driver wishes to shift to another gear, as soon as he acts upon lever V, an operating circuit is completed for both relays 24 and 25 according to (2). Above relays 24 and 25 complete, in turn, as previously, both parallel operating circuits of windings 7 and 22 and plunging core 6 is drawn into the declutching position. As soon as the driver releases lever V, contact 9 re-opens and since contacts 31 are also opened, both circuits (1) and (2) are cut-off, so that the clutching takes place as described above.

When the driver brakes, the engine remains coupled, due to the above described action of relay 23, as long as the running speed does not fall under the aforesaid minimum value, so that the engine exerts a braking effect upon the vehicle. Under said minimum speed, declutching takes place automatically due to the closing of contacts 31 and the definitive stopping of the vehicle is effected by the only usual brakes. This arrangement permits, in particular, starting and stopping abruptly after an exceedingly short run of the vehicle.

When the driver wishes to suppress the engine braking action or, in other words, to shift to "free-wheel" running, he has only to exert a slight pressure upon the gear lever, without disengaging the gears to cause declutching, as described above; alternately, he should act upon the aforesaid special switch, if any.

The gradual clutching hydraulic device shown in Fig. 2 comprises a piston 32 slidably disposed in a bore 19 of a cylinder head 33 tightly mounted on the plunging core 6; the assembly 6—33 is slidably mounted in body 35 of the solenoid so as to be subjected to the action of windings 7 and 22. Piston 32 is carried by a rod 32a threaded at both ends. Threaded end 34 of rod 32a is screwed in the stationary core or body 35 of the declutching electromagnet. Said end 34 projects out said stationary core and is provided with a slot to permit adjusting the axial position of rod 32a. Said rod is locked in the adjusted position by means of a nut 34a. Rod 32a freely passes through the bore of the plunging core 6, the tightness between rod 32a and core 6 being ensured, in the example shown, by means of a stuffing box 60. Piston 32 is completed by a member 36 screwed, as well as said piston proper, on the relevant threaded end of rod 32a and provided with ports 37. That end of rod 32a which carries piston 32 is provided with a bore 38 and a threaded plug 39 is screwed in the inner threading of piston 32 against the end of rod 32a, said plug being provided with a staggered axial passage 40—41. On the other hand, a rod 42 provided with a capillary axial passage 43 is axially secured in the bottom of cylinder 19 so as to slide within axial passage 40, 41, 38 when the cylinder moves with respect to the piston. The hollow rod 42 is provided with a mid bulging portion 44. The diameter of bulging portion 44 is substantially equal to the narrower part 41 of the staggered axial passage of plug 39, so that when said bulging portion is brought into registration with said narrower part, during the above-mentioned sliding motion, axial passage 40—41—38 is substantially closed. Ports 45 are provided in the wall of hollow rod 32a near to member 36 of the piston, so as to communicate bore 38 with that space 19a of cylinder 19 which is comprised between member 36 of the piston and the plunging core 6. A packing ring 46 made of an elastic or plastic material, such as rubber, is clamped between the members 32 and 36 of the piston, said packing ring being adapted to ensure tightness, on the one hand, between the piston and the cylinder and, on the other hand, between the piston members only in that relative displacement direction which brings the plunging core towards the piston. The length of the bulging portion 44 of the hollow rod 42 is equal to that part of the clutching stroke which corresponds to the gradual clutching phase and the length of said rod between said portion 44 and the free end of said rod is equal to that part of the clutching stroke which corresponds to the final clutching rapid phase. Finally, the bulging portion 44 merges, on either side, into the normal diameter portions of rod 32 through progressive connecting surfaces ensuring a smooth shift from the first rapid phase to the gradual phase and from the latter to the third rapid phase, or vice versa.

A passage 47 provided in the bottom of cylinder 33 and in a transverse union screwed in said cylinder bottom communicates space 19b comprised between members 32 of the piston and said cylinder bottom with the adjacent end of axial passage 43 of rod 42. Cylinder 19 as well as the different passages and bores just described are completely filled with a suitable liquid, such as oil. The three-step clutching is controlled by the flow of oil from space 19a to space 19b, said oil flowing back freely into space 19a, on the one hand, between the cylinder and packing ring 46 and, on the other hand, first between member 32 of the piston and said packing ring 46 thence, between members 32 and 36 and through ports 37. The checked oil flow mainly takes place, during the first and third rapid clutching phases, through following circuit: 19a, 45, 41, 40 19b, i. e. along a path which is comparatively broad along its whole length. During the second or gradual clutching phase, the oil flows along following circuit: 19a, 45, 43, 47, 19b. This is due to the fact that the bulging portion 44 now registrates with the narrower part 41 of the staggered axial passage 41—40 and, thus, substantially closes the same. It will be easily understood that a slight amount of oil may flow through passage 47 also during the first and third phases, during the second phase, however, the whole flow of oil from 19a to 19b necessarily takes place through said passage 47. The oil circulation within said passage is further checked by means of a needle 48 throttling said passage. In the position of said needle shown in Fig. 2, this throttling is a minimum and corresponds to the degree of gradual action which is desired for the higher gears. Needle 48 is carried by the plunging core 49 of a solenoid 50 screwed in the above mentioned transverse union. The plunging core 49 is urged towards its outermost position by a compression spring 51, the stroke of said core being limited by a nut 52 cooperating with a screw 53 secured in the body of solenoid 50 and passing freely through flange 54 of core 49. By screwing more or less nut 52, the minimum throttling position shown in Fig. 2 may be adjusted at will. When the winding 55 of solenoid 50 is energized, the movable armature 49 is sucked into solenoid 50 until abutment surfaces 56, one of which is provided on core 49 while the other one pertains to the body of solenoid 50 are brought into contact. The axial position of needle 48 in the movable armature 49 is adjustable by means of a screw 57, the clearance between said screw and the inner threading of core 49 cooperating therewith being taken up by means of a spring 58.

In the example shown winding 55 is energized in parallel with relays 24 and 25, but in a point comprised between source 8 and said relays.

The energizing circuit of winding 55 is as follows:

Battery, key 26, winding 55, contacts 56, ground.

Contacts 56 are closed when lever V is in one of two positions corresponding respectively to back drive and first gear. In all other positions of said lever, said contacts are open.

In Fig. 2, the control system is shown during the first clutching phase. The clutching is here obtained due to the fact that relays 24 and 25 are released, so that make contacts 28 and 29, thence opened, interrupt the energizing circuits of windings 7 and 22.

In Fig. 2, the clutching relay 23 is also released so that break contacts 31 are closed. The clutching is nevertheless ensured thanks to the opening of switch 30 (not shown in Fig. 2). This corresponds to the case when the engine is to be started by a displacement of the vehicle.

It is to be understood that the arrangements described above with reference to the accompanying drawing have been given merely by way of example, and that the invention may be carried into effect in other modes without departing from the principle thereof.

What is claimed is:

1. In a clutch operating mechanism for an engine driven vehicle having throttle, gear-shift and ignition controls and the clutch being normally held in engaged position, the combination of a solenoid having a movable core, an operative connection between said core and the disengageable member of the clutch so that the clutch is disengaged when the core is drawn by the solenoid to an appropriate position, a first solenoid winding, a second solenoid winding adapted, when energized, to hold the core in said position, said windings being also adapted, when energized simultaneously, to draw the core to said position, an electric current source, a first electric relay, a circuit making contact controlled by said relay, a second electric relay, a circuit making contact controlled by said second relay, an operating circuit for said first winding from said source including said first relay contact, an operating circuit for said second winding from said source including said second relay contact, a switch controlled by a driver operable ignition circuit control, a circuit breaking contact, means on said movable core for opening said circuit breaking contact when the core reaches clutch disengaging position, a third electric relay, a circuit breaking contact controlled by said third relay, a circuit making contact controlled by a driver operable gear-shift control, a first operating circuit for said first relay from said source including said ignition control switch, said core controlled contact and said third relay circuit breaking contact, a second operating circuit for said first relay including said ignition control switch, said core controlled circuit breaking contact and said gear-shift controlled circuit making contact, a first operating circuit for said second relay from said source including said ignition control switch and third relay circuit breaking contact, a second operating circuit for said second relay from said source including said ignition control switch and said gear-shift controlled circuit making contact, a dynamo driven from the engine, and an operating circuit for said third relay from said dynamo, said dynamo being arranged and adapted for generating a current sufficient to operate said third relay when the engine is running at least at a predetermined speed.

2. Clutch operating mechanism according to claim 1, further comprising a normally closed switch interposed between said third relay circuit breaking contact and said source so that when the said switch is opened the operating circuits of said first and second relays are cut off so that the clutch is engaged even if the engine is running below the aforesaid predetermined speed.

3. Clutch operating mechanism according to claim 1, further comprising hydraulic means for decomposing the clutch engagement displacement into a first rapid phase during which the clutch members are brought into initial contact, a second progressive phase during which said members are progressively engaged, and a third rapid phase during which the engagement pressure between the members is brought to its final value, said means including valve means adapted to compel oil to flow through a comparatively broad passage during said first and third phases and through a very narrow passage during said second phase, movable means for throttling said narrow passage at a maximum in a first position and at a minimum in a second position, a solenoid having a movable core arranged to move said throttling means from one position to another, normally open contacts arranged to be closed when a driver operable gear-shift lever is shifted to a low gear position, an operating circuit for said solenoid from said source including the said ignition control switch and the aforesaid contacts.

4. In a clutch operating mechanism for a vehicle having a clutch, a gear shift, an electrical current source, and an engine with throttle and ignition circuit controls, the clutch being normally held in engaged position, the combination of solenoid operated means in opeartive engagement with the disengageable member of the clutch, solenoid means for operating the same comprising a first winding and a second winding adapted when energized together with the first winding to move the disengageable member of the clutch to its disengaged position, said second solenoid winding being capable of holding said clutch in disengaged position after deenergization of said first solenoid winding, means for de-energizing and rendering inoperative said first solenoid winding as soon as the disengageable member of the clutch has reached the disengaged position, two parallel operating circuits for said windings, electrical relay means for controlling said operating circuits, control means responsive to operation of said ignition circuit control and to manipulation of said gear shift for controlling the circuit of said relay means, and a current source for said relay means comprising a dynamo driven from the engine whereby the relay means can only be actuated to release the second solenoid means to permit engagement of the clutch when the speed of the engine has reached a predetermined minimum.

5. In a clutch operating mechanism for an engine driven vehicle having throttle, gear-shift, and ignition circuit controls, the clutch being normally held in engaged position, the combination of a solenoid having a movable core, an operative connection between said core and the disengageable member of the clutch so that the latter is disengaged when the core is drawn into the solenoid to an appropriate position, a first solenoid winding, a second solenoid winding adapted when energized to hold the core in the aforesaid position, said windings being also adapted, when energized simultaneously, to draw the core to said position, an electric current source engine, two parallel operating circuits for said windings, electrical relay means for controlling said operating circuits, a driver operable ignition circuit control and a driver operable gear shift control for the energizing circuit of said relay means and a current source comprising a dynamo driven from the engine for said relay means whereby said operating circuits are cut off when the engine is running above a predetermined speed.

6. Clutch operating mechanism according to claim 5, further comprising a circuit breaking contact arranged to interrupt the operating circuit of said first solenoid winding, and means on said movable core to open said contact when the core reaches a clutch disengaging position.

7. Clutch operating means according to claim 5, further comprising hydraulic means for braking the displacements of the clutch between its disengaged and engaged positions.

8. Clutch operating means according to claim 5, further comprising hydraulic means for decomposing the engaging displacement of the clutch into a first rapid phase during which the clutch members are brought into initial contact, a second gradual phase during which said members are progressively engaged, and a third rapid phase during which the engagement pressure between the members is brought to its final value.

9. Clutch operating means according to claim 5, further comprising hydraulic means for decomposing the clutch engaging displacement into a first rapid phase during which the clutch members are brought into initial contact, a second gradual phase during which said members are progressively engaged, and a third rapid phase during which the engagement pressure between the clutch members is brought to its final value, means for automatically selecting one of two degrees of gradual action for the second phase, and means for controlling said selecting means from a driver operable gear-shift control.

10. Clutch operating means according to claim 5, further comprising hydraulic means for decomposing the clutch engagement displacement into a first rapid phase during which the clutch members are brought into initial contact, a second gradual phase during which said members are progressively engaged, and a third rapid phase during which the engagement pressure between the members is brought to its final value, said hydraulic means including valve means for compelling oil to flow through a comparatively broad passage during said first and third phases and through a very narrow passage during the second phase, movable means for throttling said narrow passage at a maximum in a first position and at a minimum in a second position, and means controlled from a driver operable gear-shift control for moving said throttle means from one position to the other.

11. Clutch operating means according to claim 5, further comprising hydraulic means for decomposing the engagement displacement of the clutch into a first rapid phase during which the clutch members are brought into initial contact, a second gradual phase during which said members are progressively engaged, and a third rapid phase during which the engagement pressure between the members is brought to its final value, said means including valve means for compelling oil to flow through a comparatively broad passage during said first and third phases and through a very narrow passage during said second phase, movable means for throttling said narrow passage at a maximum in a first position and at a minimum in a second position, means controlled from a driver operable gear shift control for moving said throttling means from one of said positions to another, and means for separately adjusting said minimum and maximum throttling positions.

References Cited in the file of this patent

UNITED STATES PATENTS

| | | |
|---|---|---|
| 2,152,088 | Price et al. | Mar. 28, 1939 |
| 2,201,118 | Beede | May 14, 1940 |
| 2,480,768 | Price | Aug. 30, 1949 |
| 2,513,521 | Sampietro | July 4, 1950 |
| 2,554,314 | Price | May 22, 1951 |
| 2,631,701 | Ainsworth | Mar. 17, 1953 |